Figure 2:
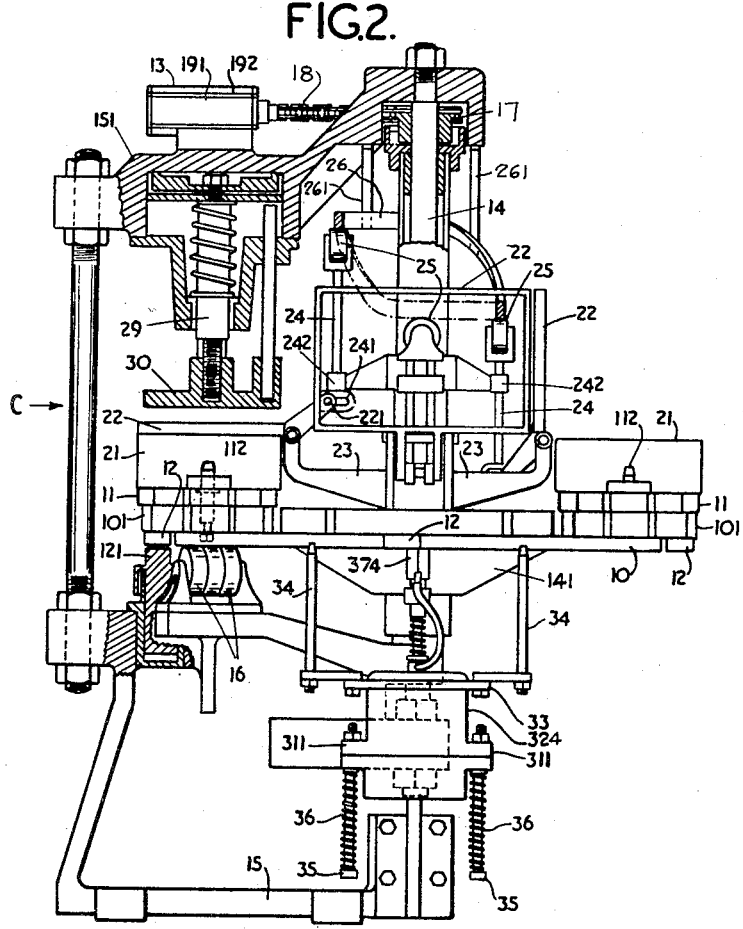

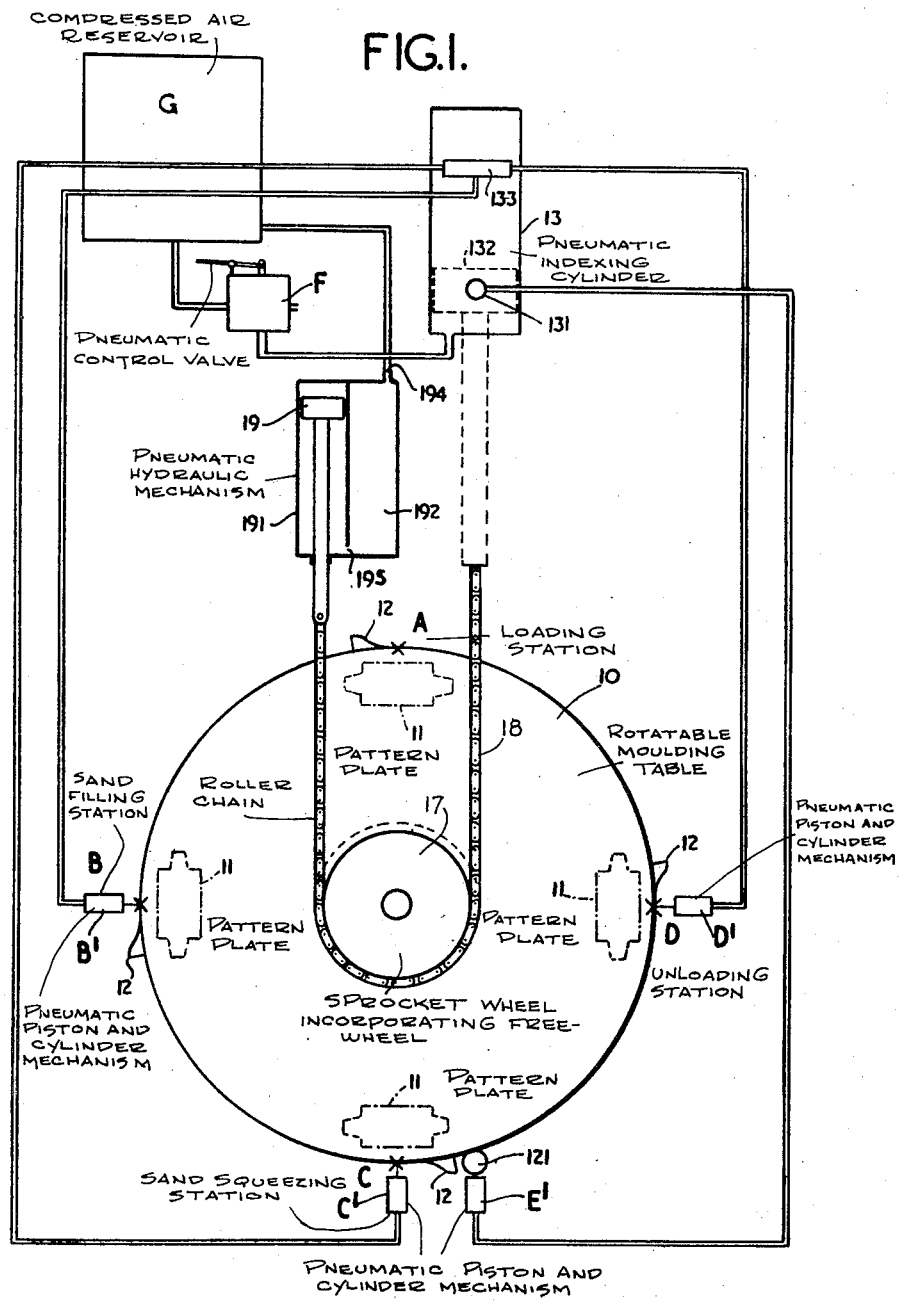

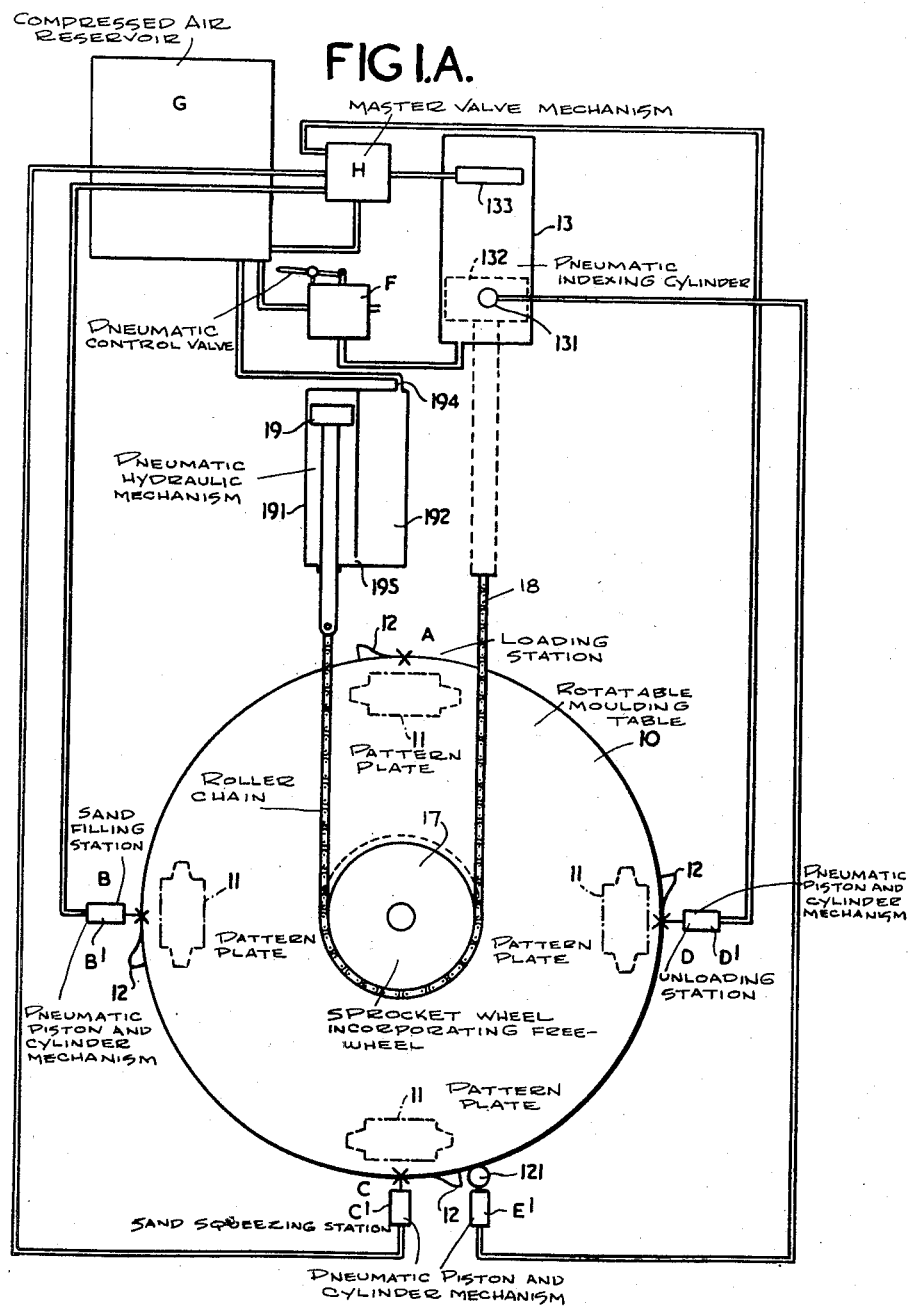

Aug. 12, 1958  H. B. HALLSWORTH  2,846,739
FOUNDRY MOULDING MACHINES
Filed Sept. 9, 1954  6 Sheets-Sheet 4
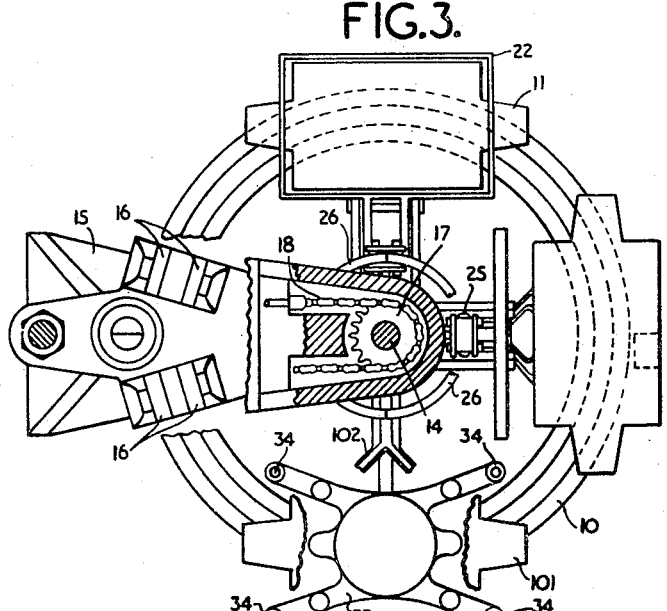
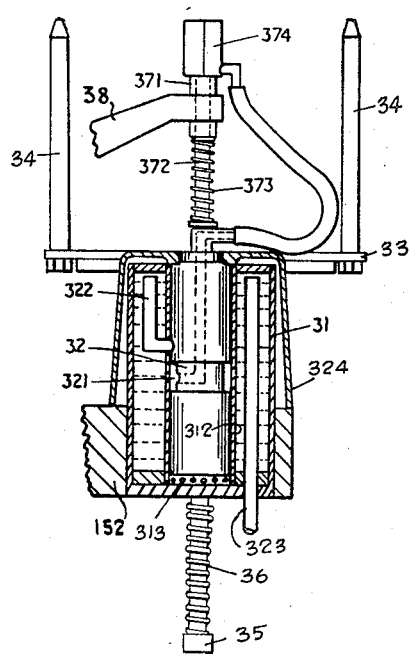
Henry B. Hallsworth
by Kenway, Jenney, Witter & Hildreth
Att'ys.

Aug. 12, 1958  H. B. HALLSWORTH  2,846,739
FOUNDRY MOULDING MACHINES
Filed Sept. 9, 1954  6 Sheets-Sheet 5
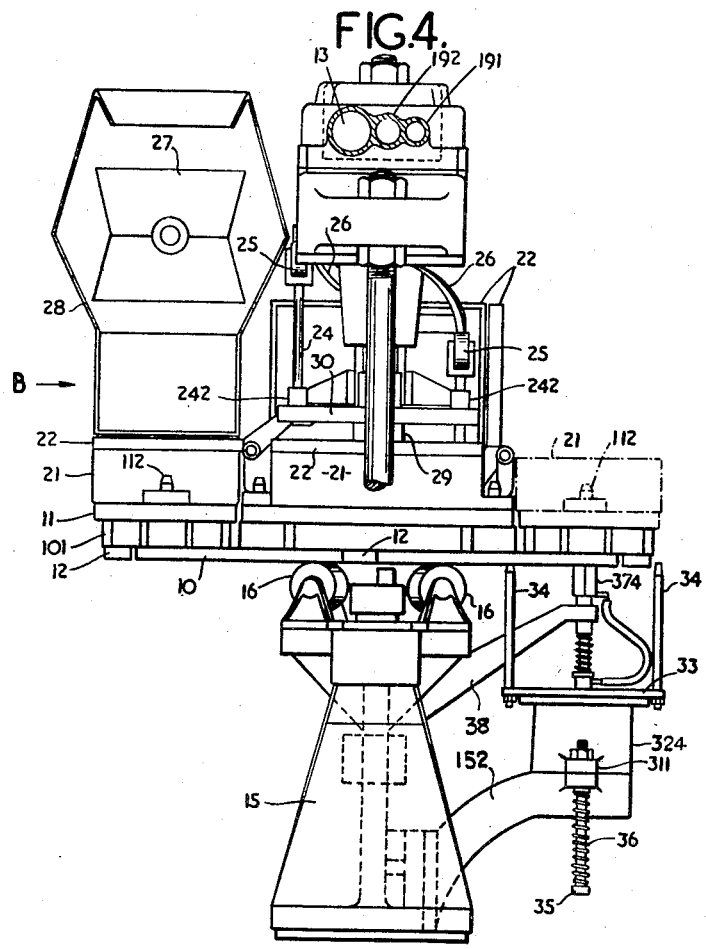
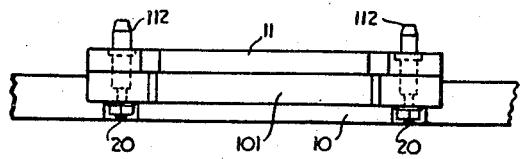

Aug. 12, 1958     H. B. HALLSWORTH     2,846,739
FOUNDRY MOULDING MACHINES

Filed Sept. 9, 1954     6 Sheets-Sheet 6

United States Patent Office 2,846,739
Patented Aug. 12, 1958

2,846,739
FOUNDRY MOULDING MACHINES

Henry Bertram Hallsworth, Walsall, England, assignor to Rubery, Owen & Co. Limited, Darlaston, England, a limited-liability company of Great Britain Application September 9, 1954, Serial No. 454,872

9 Claims. (Cl. 22—21)

This invention has reference to improvements in foundry moulding machines and has for its object to provide a foundry moulding machine which is especially suited for repetition moulding and which permits of a higher output and the use of less labour than foundry moulding machine heretofore in use.

According to the invention the improved foundry moulding machine incorporates a turnable supporting means adapted to carry a plurality of patterns arranged at spaced intervals thereon, fluid operated piston and cylinder mechanism of indexing the turnable table from a loading station where a moulding box is fitted to a pattern to a station where the fitted moulding box is filled with sand, thence to a sand squeezing station where pressure is applied to the sand in the moulding box, with or without jarring, subsequently to an unloading station where the completed mould is removed from the pattern and thence back to the loading station, fluid operated means for occasioning a filling of the moulding box with sand at the sand filling station, fluid operated means for applying pressure to the sand at the sand squeezing station, fluid operated means for effecting the removal of the mould from the pattern at the unloading station, means for arresting the movement of the table as the patterns arrive at the respective stations and fluid operated means for effecting the operation of the said arresting means, the fluid means at the sand filling station, the fluid operated means at the sand squeezing station and the fluid operated means at the unloading station being interconnected with the cylinder of the fluid operated indexing mechanism and being controlled by the movement of the piston therein so that initial movement of the piston in the cylinder of the indexing mechanism causes the arresting mechanism to be brought into operation to arrest the table when the patterns arrive at a station and so that continued movement of the said piston subsequently occasions the bringing into operation simultaneously of the fluid operated means at the sand filling, sand squeezing and unloading stations so that sand filling, sand squeezing and mould removal operations take place simultaneously.

The invention also resides in a foundry moulding machine constructed, arranged and adapted for use substantially as will be described hereinafter.

An embodiment of the invention will now be described with particular reference to the accompanying drawings which illustrate the invention in its application to a foundry moulding machine specifically intended for the repetitive production of moulds from wood or metal pattern plates and using pneumatic or pneumatic-hydraulic power.

In the drawings:

Figure 1 is a diagrammatic representation illustrating the basic principles underlying the invention, Figure 1A is a diagrammatic representation generally similar to Figure 1 but illustrating a modified manner of utilising the basic principles underlying the invention as illustrated in the said Figure 1, Figure 2 is a view partly in side elevation and partly in vertical section of a practical form of the machine looking from the unloading station with parts broken away or omitted where desirable for the sake of clearness.

Figure 3 is a view plan of Figure 2 partly in section and with parts broken away or omitted, where desirable for the sake of clearness.

Figure 5:
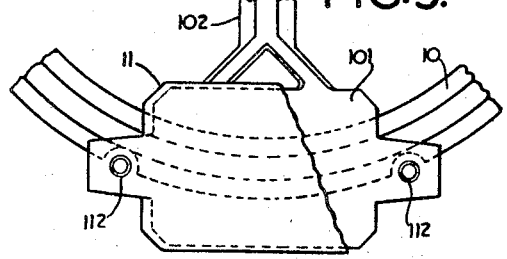
Figure 8:
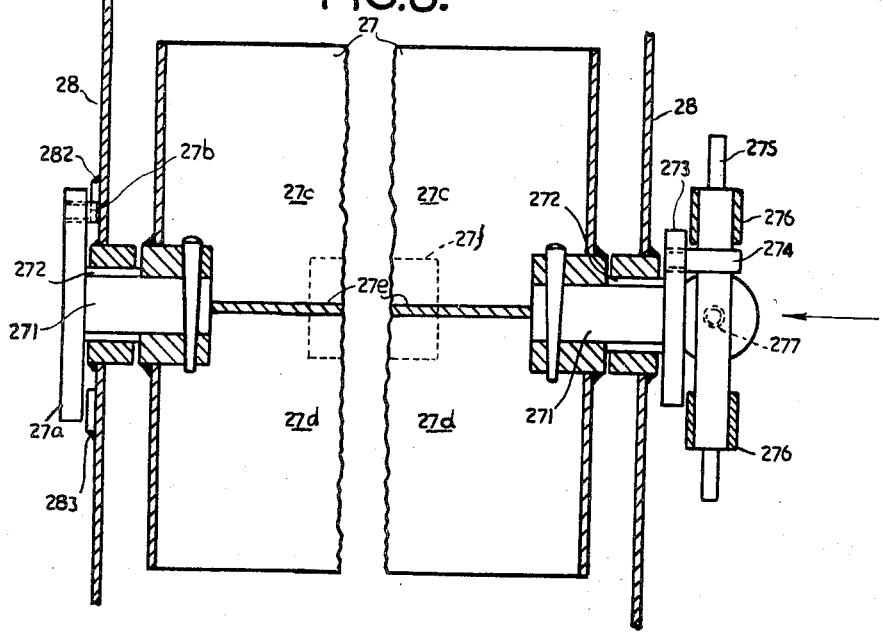
Figure 9:
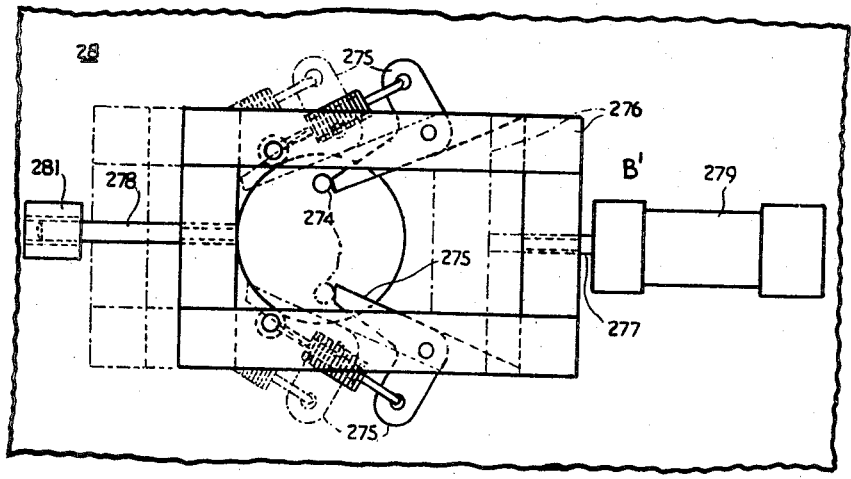

Figure 4 is a side elevation of the embodiment of the invention as illustrated in Figures 2 and 3 looking from the sand squeezing station with parts broken away or omitted, where desirable, for the sake of clearness, Figure 5 is a fragmentary view in plan illustrating the manner of securing a pattern plate to its platform, Figure 6 is an edge view of Figure 5, Figure 7 is a fragmentary view illustrating the manner of associating the vibrator with the lifting mechanism at the unloading station, Figure 8 is a fragmentary view partly in rear elevation but mainly in vertical section and on an enlarged scale illustrative of the manner of effecting filling at the sand filling station and Figure 9 is a fragmentary view in rear elevation of the mechanism illustrated in Figure 8 looking in the direction of the arrow in the said Figure 8.

In the drawings, where desirable, like numerals of reference indicate similar parts in the several views.

As illustrated in Figure 1 the improved foundry moulding machine incorporates basically a rotatable table 10 which is adapted to have secured thereto at four equidistantly spaced positions pattern plates 11 and which is adapted to be indexed in an anti-clockwise direction as seen in Figure 1 by a pneumatic-hydraulic piston and cylinder mechanism so that a pattern plate 11 and a moulding box fitted thereon is progressed from a loading station indicated by the reference letter A to a sand filling station denoted by the reference letter B, thence to a sand squeezing station denoted by the reference letter C, subsequently to an unloading station denoted by the reference letter D and a pattern plate after the removal of a moulding box returned to the loading station A for a renewed cycle.

Adjacent to each pattern plate 11 the table 10 is provided with a projection 12 adapted to cooperate with a displaceable stop 121 for arresting the table 10 at a station A, B, C, D.

The sand filling mechanism at the station B, the sand squeezing mechanism at the station C, the table stop mechanism $E^1$ and the unloading mechanism at the station D are each provided with a pneumatic or pneumatic hydraulic piston and cylinder mechanism denoted respectively by the references $B^1$, $C^1$, $D^1$, $E^1$.

The cylinder of the table stop mechanism $E^1$ is in communication with a port 131 in the indexing cylinder 13 which is uncovered by the piston 132 on the initiation of an indexing stroke.

The cylinders of the pneumatic or pneumatic-hydraulic mechanisms $B^1$, $C^1$, $D^1$ of the sand filling mechanism, the sand squeezing mechanism and the unloading mechanism respectively are all connected with a common port 133 in the indexing cylinder 13 which is uncovered as the piston 132 approaches the end of its stroke.

The control of the indexing mechanism and indeed of the whole machine is effected by a pneumatic valve mechanism designated by the reference letter F which operates in a known manner and which is of a known proprietary make.

This pneumatic valve mechanism F which operates in a known manner and which is of a known proprietary make is electromagnetically controlled and operates on a time cycle and for the purpose of the present invention is adapted to operate as follows:

On switching on the electric current the solenoid incorporated in the said valve mechanism F is energised and causes the valve to open to place the compressed air reservoir G in communication with the lower end of the cylinder 13 and thereby occasion an upward displacement of the piston 132 in the said cylinder 13. This upward displacement of the piston 132 in the cylinder 13 first occasions the opening of the port 131 and subsequently as the said piston 132 approaches the end of its stroke the opening of the port 133.

The valve incorporated in the valve mechanism F remains open for a period dependent upon its initial setting and at the expiry of this period moves to the exhaust position so that the cylinder 13, the cylinders of the pneumatic or pneumatic-hydraulic mechanisms or one end of the cylinder of such mechanisms in the event of a double action fluid operated piston and cylinder mechanism being used are opened to exhaust.

The valve aforesaid remains open to exhaust for a period of time which enables the piston 132 and the mechanisms at the stations B, C and D and the table stop mechanism $E^1$ to return to their initial position whereupon the cycle is repeated since the valve mechanism F remains in action continuously until the electric current is switched off.

It may be remarked also that the pneumtaic or pneumatic-hydraulic piston and cylinder mechanisms referred to herein are well-known articles of commerce so that their construction and manner of operation are well-known to those skilled in the art.

The sequence of operations is as follows:

A pattern plate 11 is secured to the table 10 at each of the four positions and as each pattern plate occupies the loading station A one half of a moulding box is positioned on the pattern plate 11 in the customary manner.

The valve mechanism F is manipulated to set the machine in operation and the machine continues in operation until the said valve mechanism F is manipulated to occasion the stoppage of the machine.

Subsequent to the manipulation of the valve mechanism F to set the machine in operation air enters the indexing cylinder 13 and occasions upwards displacement of the piston 132 therein.

The upward displacement of the piston 132 through chain and sprocket gearing occasions a rotation of the table 10. When the piston 132 has moved to an extent which results in the uncovering of the port 131 the pneumatic mechanism $E^1$ is actuated and caused to move the stop 121 into an arresting position relatively to the relevant projection 12 for stopping the table in the next required position.

The degree of travel of the piston 132 for this stage is such that the rotation of the table 10 is stopped when a pattern plate and moulding box have been progressed through an arc of 90° so that a pattern plate and moulding box from the loading station A will have been progressed to the sand filling station B, a sand filled moulding box from the sand filling station B progressed to the sand squeezing station C, a sand squeezed moulding box progressed from the sand squeezing station C to the unloading station D and a pattern plate after the removal of its moulding box at the unloading station D returned to the loading station A for the fitting of another moulding box.

Immediately prior to the arrival of a moulding box and pattern plate 11 at the sand filling station B there is fitted on to the moulding box a sand rim, not shown in Figure 1, as will be described hereinafter.

Subsequent to the uncovering of the port 131 the piston 132 moves to uncover the port 133 thereby simultaneously bringing into action the automatic sand filling mechanism at the station B, the sand squeezing mechanism at the station C and the unloading mechanism at the station D.

The final stage of the movement of the piston 132 opens the indexing cylinder 13 to exhaust and occasions the return of the piston 132 to its initial position for a repetition of the foregoing cycle of operations which continue until the valve mechanism F is manipulated to stop the machine.

In the arrangement illustrated in Figure 1A which is generally similar to that illustrated in Figure 1 except that instead of connecting the cylinder 13 directly to the pneumatic mechanisms located at the stations B, C and D by way of the port 133 and individual pipe lines, the said port 133 is in communication with the interior of the casing of a pneumatic master valve mechanism H of known construction which is in communication also with the compressed air supply reservoir G and with the pneumatic mechanisms at each of the stations B, C and D by individual pipe line.

In operation of the modified arrangement illustrated in Figure 1A as the piston 132 is displaced upwardly in the cylinder 13 on the initiation of an indexing operation the port 131 is first uncovered whereby compressed air is permitted to pass to the pneumatic mechanism $E^1$ so that the stop E is brought into the arresting position. When the piston 132 uncovers the port 133 the valve incorporated in the master valve mechanism H is actuated to place the pneumatic mechanisms $B^1$, $C^1$ and $D^1$ in communication with the compressed air reservoir G.

Likewise on the cylinder 13 being opened to exhaust the valve incorporated in the valve mechanism H cuts off communication between the compressed air reservoir G and the relevant pneumatic mechanisms.

The use of interposed valve mechanism H for governing the supply of compressed air to the pneumatic mechanisms at stations B, C and D prevents starvation of the indexing cylinder 13 and so makes for more efficient operation of the several pneumatic mechanisms.

If desired the port 131 may open into the casing of a pneumatic valve mechanism which is of analogous construction to the master valve mechanism H and which is in communication with the compressed air supply reservoir G and with the pipe line to the pneumatic mechanism $E^1$ for operating the table stop 121 whereby the compressed air for operating the pneumatic mechanism $E^1$ may pass directly from the reservoir G to the said pneumatic mechanism $E^1$ but as the demand on the compressed air supply of the pneumatic mechanism $E^1$ is small the supply by way of the cylinder 13 proves to be satisfactory for the purpose desired.

Referring now to the practical embodiment of the invention as illustrated in Figures 2 to 4.

According to this illustrated embodiment of the invention the annular table 10 is supported on the underside by radial arms 141 which are fixed to a vertical shaft 14, the lower end of which is rotatably mounted within bearings carried by a base pedestal 15 and the pattern plates 11 are mounted on platforms 101 of the same configuration as the pattern plates 11 but of slightly lesser dimensions, said platforms 101 being rigid with the annular table 10 and with the radial arms 102 fixed to a central limb turnable with the shaft 14.

At one side which corresponds to the position occupied by the sand filling station B the underside of the table 10 rests on pairs of radially arranged horizontally disposed freely turnable rollers 16.

At its upper end the shaft 14 has fixed thereon a sprocket wheel 17 which cooperates with a length of roller chain 18 said sprocket wheel 17 incorporating a "free-wheel" or ratchet clutch device.

One end of the length of roller chain 18 is connected to the outer end of the piston rod 132 of a single action fluid operated piston and cylinder mechanism forming the pneumatic section of the indexing mechanism.

The other end of the length of roller chain 18 is connected to the piston 19 of a pneumatic-hydraulic mechanism the piston cylinder of which is designated by the reference numeral 191 and the oil chamber by the reference numeral 192, the said oil chamber 192 always being in communication with a source of fluid pressure by way of the inlet 194 and with the piston cylinder 191 by way of a common port 195. Thus by reason of the piston 132 being of greater area than the piston 19 on admission of air into the cylinder 13 the upward displacement of the piston 132 overcomes the resistance of the oil acting on the underside of the piston 19 so that the piston 19 descends in its cylinder 191 to enable indexing to take place and on the cylinder 13 being opened to exhaust the oil in the chamber 192 which is under pressure acts on the underside of the piston 19 to return the said piston to the initial position.

The cylinder 13 of the indexing mechanism, the piston cylinder 191 and the oil chamber 192 are formed as a unit casting and are mounted on top of a fixed part 151 which overhangs the table 10 and which is supported from the base pedestal 15, said overhanging part 151 also carrying a bearing for the shaft 14.

The pattern plates 11 are of normal construction and each such pattern plate 11 is bolted to a platform 101 which in turn is fixed on the annular table 10, the platforms 101 being slotted for the accommodation of securing bolts 20.

The pattern plates 11 are provided with the usual dowels 112 for the location of a moulding box 21.

At the loading station A there is placed on the pattern plate 11 located at the said station one half of a moulding box 21 in accordance with normal practice.

Adapted to be fitted on top of each moulding box 21 as it approaches the sand filling station B is a sand rim 22.

Each sand rim 22 is formed as a skeleton rectangular frame which constitutes the longer arm of a lever of the first order of levers which is fulcrumed on an arm 23 radially supported from the shaft 14.

The shorter arms of the sand rim levers project upwardly and each is provided with a roller 221 which engages in a slot 241 formed at the lower end of a vertically displaceable rod 24 mounted in bearings in sleeves 242 carried by a fixed part. The said rods 24 at their upper ends are provided with rollers 25 which bear on a cam track 26 under the influence of the weight of the relevant sand rims 22. The cam track 26 is suspended from the fixed part 151 by means of hangers 261.

Disposed above the sand filling station B is a sand hopper 27 which is pegged to stub axles 271 which are rotatably mounted in bearings 272 supported by the sides of a chute 28 within which the said sand hopper 27 is located.

The rear stub axle 271 is provided on the outer end thereof with a disc 273 which carries an outwardly projecting crank pin 274. This crank pin 274 cooperates with a pair of oppositely acting and oppositely disposed spring influenced pawls 275 which are pivoted to the top and bottom sides of a skeleton rectangular frame 276 at intermediate positions.

At the centre of one end the frame 276 is connected to the piston rod 277 of the cylinder of the pneumatic mechanism B¹ of the sand filling mechanism, whilst at the centre of the other end the said frame 276 is fixed to a horizontally arranged rod 278 which is in alignment with the piston rod 277 and which is slidably mounted in a guide 281 fixed to the side of the chute 28. The cylinder 279 of the pneumatic mechanism B¹ is supported by a side of the chute 28 and the said pneumatic mechanism is of the double acting type.

The opposite stub axle 271 is provided with a disc 27a having an inwardly directed arm 27b which cooperates with a pair of oppositely disposed stops 282, 283 respectively which are fixed to the front of the chute 28 in superposed relationship.

The hopper 27 is divided into two equal compartments 27c and 27d by a partition 27e.

At one side the hopper is provided with a weight 27f which maintains the hopper 27 in a state of out of balance.

The mouth of the chute 28 is located above the position occupied by a moulding box 22 when at the sand filling station B.

The sand is filled continuously into the compartment 27c, 27d of the hopper 27 which is uppermost at the time at a rate such that the correct quantity of sand for filling a moulding box to the level of the sand rim is fed into the said compartment during the time taken to index a moulding box from the moulding station A to the said filling station B.

During the filling of a compartment the hopper is prevented from turning by the arm 27b contacting one or other of the stops 282, 283 but when air is admitted to the cylinder 279 under the control of the piston 132 the frame 276 is displaced laterally thereby causing one or other of the pawls 275 to strike the projection crank pin 274 according to which pawl 275 is in contact therewith at the time and urge the hopper 27 under the impetus imparted by the movement of the piston rod 277 to rotate so that the hopper is inverted and the sand in the former compartment filled into the moulding box and sand rim.

The continued rotation of the hopper 27 after rotation has been initiated by the pawl 275 and crank pin 274 is arrested when the arm 27b contacts the relevant stop 282, 283.

On the return movement of the piston rod 277 the lower pawl 275 is tripped to permit of the return movement of the crank pin 274 which then is in its lowermost position so that on air again being admitted to the forward acting end of the cylinder 279 the succeeding movement of the frame 276 causes the lower pawl to strike the crank pin 274 which is still occupying its lowermost position to urge the hopper 27 in a counterclockwise direction.

It may be pointed out that the upper pawl is free to yield against the resistance of its spring in a clockwise direction as viewed in Figure 9 whilst the lower pawl 275 is permitted to yield in a counterclockwise direction as viewed in Figure 9 in opposition to the resistance of its spring so on the respective return movements the pawls 275 yield to permit the crank pin 27 to ride thereover during such return movements (see dotted line position Figure 9).

Disposed above the squeezing station C, as shown in Fig. 2, is a single action spring return pneumatically operated piston and cylinder mechanism C having a vertical depending piston 29 the lower end of which carries a horizontally arranged pressure plate 30 of a size adapted to fit within the confines of the size of sand rim 22 which is employed.

Fixed to the annular table 10 at four equidistantly spaced points are projections 12 which are adapted to cooperate with a stop plunger 121 mounted in the cylinder of the pneumatic mechanism E¹. This pneumatic mechanism E¹ also is of the single action spring return type.

Located below the rotatable table 10 at the unloading station D, as shown in Figs. 3 and 7, is the pneumatic-hydraulic mechanism D¹, the oil filled cylinder 31 whereof is carried by an arm 152 supported from the base pedestal 15.

Mounted within the cylinder 31 is an inner cylinder 312 within which is mounted a piston 32 to which is secured an inverted cup-shaped shroud 324 to the upper portion of which is secured the central portion of a spider 33 having at the ends of each arm thereof an upstanding rod 34.

These upstanding rods 34 are adapted to pass through slots in the platforms 101 and in the table 10 and to bear against the underside of the base of a moulding box 21.

The inverted cup-shaped shroud 324 is guided by rods 35 (see Fig. 2) which are slidably mounted in lugs 311 provided on the said shroud 324, and on the supporting arm 152, springs 36 being arranged round the said guide rods 35 which tend to draw the piston 32 and shroud 324 into the lowermost position.

Adapted to be located within the space bounded by the upstanding rods 34 is a pneumatically operated vibrator incorporating a sleeve 371 within which is telescopically mounted the upper end portion of a tubular rod 372 the lower end of which is fixed to the piston 32, a spring 373 being interposed between the lower end of the sleeve 371 and the piston 32.

The sleeve 371 is displaceable vertically within a bearing carried by a bracket 38 supported from the pedestal 15.

Compressed air is supplied to the upper end of the cylinder 31 by way of the port 133 and pipe 323, the compressed air thus introduced displacing oil from the cylinder 31 which passes by ways of ports 313 into the inner cylinder 312 to effect therein a displacement of the piston 32.

The piston 32 is provided with a port 321 which registers with a compressed air supply passage 322 when the piston 32 occupies a position substantially midway in its stroke. When the port 321 registers with the passage 322 compressed air can pass to the operating cylinder of the vibrator and actuate the vibrator in known manner. The vibrator serves the well-known purpose of facilitating the separation of a mould from a pattern and a more detailed description is not necessary to an understanding of this invention.

On the initial lifting movement of the piston 32 the port 321 is not in register with the passage 322 and the vibrator as a whole is raised with the spider 33. This combined lift continues until the vibrator head 374 contacts the underside of the relevant pattern plate 11 and when this obtains the port 321 and the passage 322 register so that the vibrator is brought into action. At this stage the upstanding rods 34 are still clear of the relevant moulding box 21.

Susequent movement of the piston 32 occasions the closing of the port 321 thus putting the vibrator out of action and a further lifting of the spider 33 and upstanding rods 34 which causes the said rods 34 to lift the moulding box 21 from the pattern plate 11.

It will be understood that the telescopic action of the rod 372 relatively to sleeve 371 in conjunction with the spring 373 permits of the requisite relative motion taking place between the spider 33 and the vibrator during the lifting of the moulding box 21 from the pattern plate 11.

The cam track 26 is arranged so that as the sand rims 22 approach the sand filling station B the rollers 26 are permitted to rise and so allow the sand rims 22 to fall and fit themselves on top of the moulding boxes 21 preparatory to filling with sand.

At the sand filling station B it will be understood that the sand rims 22 permit surplus sand to be filled into the moulding boxes 21 so as to provide for squeezing at the sand squeezing station C.

The cam track 26 allows the sand rims 22 to remain in position on the moulding boxes at the sand squeezing station C, but at the unloading station D and at the loading station A the said cam track 26 is arranged so that the rollers 25 are depressed whereby the said rims 22 are moved into the vertical position as is clearly seen, in Figure 2.

As has been mentioned in connection with the description of Figure 1 the cylinder of the stop mechanism $E^1$ is connected to the port 131 of the indexing cylinder 13 whilst the cylinders of the pneumatic mechanisms $B^1$, $C^1$, and $D^1$ are all in communication with the common port 133 in the said indexing cylinder 13.

The operations of the stop mechanism and of the sand filling mechanism and of the sand squeezing mechanism and of the unloading mechanism are similar to or analogous to the operations which have been described in connection with Figure 1. Conveniently the pattern plates 11 are alternated so that the moulds arrive at the unloading station D in succeeding half moulds thus enabling a complete mould to be assembled at the unloading station D by manual or pedal operation of the valve mechanism F.

Conveniently also two operators only are employed one at the loading station A and one at the unloading station D, the operation of the indexing mechanism being controlled by the operative at the unloading station D.

If desired means may be provided for jarring or vibrating the pattern and moulding boxes during the sand squeezing operation in order to effect consolidation of the sand in known manner, said jarring being effected by a jolting cylinder located below the annular table 10 at the sand squeezing station C.

It will be appreciated that when the machine is in action the several operations of loading, sand filling, sand squeezing and unloading are taking place continuously and simultaneously.

It should be appreciated also that the pneumatic-hydraulic mechanism constituted by the piston 19, cylinder 191 and oil chamber 192 exert a dash pot action on the indexing mechanism and so ensure a smooth indexing operation.

As has been mentioned hereinbefore the pneumatic and pneumatic-hydraulic mechanisms referred to herein are well-known in commerce so that a detailed description of their construction and manner of operation is not necessary to an understanding of this invention.

If desired, hydraulically actuated mechanisms may be substituted for the pneumatic and pneumatic-hydraulic mechanism referred to herein.

Further it will be understood that the control of the indexing mechanism may be accomplished by mechanically operated valve mechanism in place of the manually or pedal operated mechanism described hereinbefore.

It is found in practice that a foundry moulding machine in accordance with the invention enables moulds to be produced repetitively at a faster rate than has been attained with foundry moulding machines heretofore in use and less labour.

It is to be understood that the invention is not limited to the production of any particular size of mould, but may be adapted for the production of any size of mould which can be dealt with advantageously.

I claim:

1. A foundry moulding machine having loading, sand filling, sand squeezing and unloading stations and incorporating a turnable supporting means adapted to carry a plurality of patterns arranged at spaced intervals thereon, fluid operated piston and cylinder mechanism for indexing the turnable table from the loading station where a moulding box is fitted to a pattern to the station where the fitted moulding box is filled with sand, thence to the sand squeezing station where pressure is applied to the sand in the moulding box, subsequently to the unloading station where the completed mould is removed from the pattern and thence back to the loading station, fluid operated means for occasioning a filling of the moulding box with sand at the sand filling station, fluid operated means for applying pressure to the sand at the sand squeezing station, fluid operated means for effecting the removal of the mould from the pattern at the unloading station, means for arresting the movement of the table as the patterns arrive at the respective stations and fluid operated means for effecting the operation of the said arresting means, the fluid operated means at the sand filling station, the fluid operated means at the sand squeezing station and the fluid operated means at the unloading station being interconnected with the cylinder of the fluid operated indexing mechanism and being controlled by the movement of the piston therein so that initial movement of the piston in the cylinder of the indexing mechanism causes the arresting mechanism to be brought into operation to arrest the table when the patterns arrive at a station and so that continued movement of the said piston subsequently occasions the bringing into operation simultaneously of the fluid operated means at the sand filling, sand squeezing and unloading stations so that sand filling, sand squeezing and mould removal operations take place simultaneously, together with a rotatable hopper for feeding sand into a moulding box at the sand filling station, the rotation of said hopper for discharge purposes being effected by means associated with the indexing mechanism whenever a moulding box arrives at the sand filling station.

2. A foundry moulding machine according to claim 1 in which there is provided below the turnable pattern supporting means at the unloading station, a fluid operated mechanism the displacement element whereof carries a spider having upstanding rods adapted to engage the moulding box when positioned at the unloading station and to effect a lifting thereof from the pattern.

3. A foundry moulding machine according to claim 1 having a movable sand rim and in which pressure is applied to the sand at a sand squeezing station by a pressure exerting means which is adapted to fit within the confines of the sand rim and wherein pressure is under the control of the indexing means.

4. A foundry moulding machine according to claim 1 having fluid operated lifting mechanism for the moulding box and in which there is associated with the lifting mechanism means for imparting a vibration to the pattern for facilitating the removal of the moulding box from the pattern.

5. A foundry moulding machine according to claim 1 having a sand rim for each moulding box and in which the sand rims cooperate with a cam track which is arranged so that a sand rim is fitted to a moulding box as it progresses from a loading station to the sand filling station and is maintained fitted to the moulding box at the sand filling station and at the sand squeezing station and is moved clear of the moulding box preparatory to the removal of the moulding box at the unloading station.

6. A foundry moulding machine according to the preceding claim 5 in which each sand rim is in the form of a skeleton frame carried by one arm of a lever and in which the sand rims tend to remain in the fitting position under the action of gravity and in which a cam track and roller means is provided for effecting the lowering and raising of the sand rims relatively to the moulding boxes as required.

7. A foundry moulding machine for working in conjunction with a station where moulding boxes are loaded, a station where sand is filled into a moulding box which has been loaded at the loading station, a succeeding station where sand in a moulding box which has been filled at the sand filling station is squeezed and a succeeding station where a moulding box, the sand wherein has been squeezed at the squeezing station, is unloaded, having in combination an indexable carrier means for traversing the moulding boxes from station to station, a source of fluid pressure, fluid actuated piston and cylinder mechanism for effecting the indexing of said carrier means which derives its energy from the said source of fluid pressure, automatically operable fluid actuated means for arresting the carrier means at a station as each indexing step is performed, automatically operable fluid actuated means for effecting a filling of a moulding box with sand when at the sand filling station, automatically operable fluid actuated means for effecting a removal at the unloading station of a moulding box which successively has been loaded at the loading station, filled with sand at the sand filling station and the sand squeezed at the sand squeezing station, operator actuatable valve means for initiating and stopping the supply of pressure fluid to the cylinder of the fluid actuated indexing means, said valve means being such that when once actuated to institute indexing, indexing is caused to continue until said valve means is actuated to occasion a cessation thereof, pressure fluid supply means for the fluid actuated mechanism for the arresting means and for the fluid actuated means at the sand filling, sand squeezing and unloading stations under the control of the piston of the indexing mechanism whereby movement of the piston in the indexing cylinder for effecting indexing of the carrier means occasions an arresting of a moulding box at each station during its progress and the performance simultaneously at the relevant stations at which a moulding box may be halted of the operations of sand filling, sand squeezing and moulding box unloading.

8. A foundry moulding machine for working in conjunction with a station where moulding boxes are loaded, a station where sand is filled into a moulding box which has been loaded at the loading station, a succeeding station where sand in a moulding box which has been filled at the sand filling station is squeezed and a succeeding station where a moulding box the sand wherein has been squeezed at the squeezing station is unloaded, incorporating an indexable carrier means for traversing the moulding boxes from station to station, a source of fluid pressure, fluid actuated piston and cylinder mechanism for effecting the indexing of said carrier means which derives its energy from the said source of fluid pressure, automatically operable fluid actuated means for arresting the carrier means at a station as each indexing step is performed, automatically operable fluid actuated means for effecting a filling of a moulding box with sand when at the sand filling station, automatically operable fluid actuated means for effecting a removal at the unloading station of a moulding box which successively has been loaded at the loading station, filled with sand at the sand filling station and the sand squeezed at the sand squeezing station, operator actuable valve means for initiating and stopping the supply of pressure fluid to the cylinder of the fluid actuated indexing means, said valve means being such that when once actuated to institute indexing, indexing is caused to continue until said valve means is actuated to occasion a cessation thereof, ports in the cylinder of the fluid actuated means connected with the source of fluid pressure and with the fluid actuated mechanism for arresting means and with the fluid actuated means at the sand filling, sand squeezing and unloading stations whereby movement of the piston and the indexing cylinder for effecting indexing of the carrier means first occasions an arresting of a moulding box at each station during its progress and subsequently the performance simultaneously at the relevant stations at which a moulding box may be halted of the operations of sand filling, sand squeezing and moulding box unloading.

9. A foundry moulding machine for working in conjunction with a station where moulding boxes are loaded, a station where sand is filled into a moulding box which has been loaded at the loading station, a succeeding station where sand in a moulding box which has been filled at the sand filling station is squeezed and a succeeding station where a moulding box the sand wherein has been squeezed at the squeezing station is unloaded, having in combination an indexable carrier means for traversing the moulding boxes from station to station, a source of fluid pressure, fluid actuated piston and cylinder mechanism for effecting the indexing of said carrier means which derives its energy from the said source of fluid pressure, automatically operable fluid actuated means for arresting the carrier means at a station as each indexing step is performed, automatically operable fluid actuated means for effecting a filling of a moulding box with sand when at the sand filling station, automatically operable fluid actuated means for effecting a removal at the unloading station of a moulding box which successively has been loaded at the loading station, filled with sand at the sand filling station and the sand squeezed at the sand squeezing station, operator actuable valve means for initiating and stopping the supply of pressure fluid to the cylinder of the fluid actuated indexing means, said valve means being such that when once actuated to institute indexing, indexing is caused to continue until said valve means is actuated to occasion a cessation thereof, pressure fluid supply means for the fluid actuated mechanism for the arresting means controlled by the piston of the indexing mechanism, a common master valve mechanism for controlling the supply of pressure fluid to the automatically operating fluid actuated means at the sand filling, sand squeezing and unloading stations, said common master valve mechanism being connected to the source of fluid pressure and being controlled by the piston of the indexing mechanism, whereby movement of the piston and the indexing cylinder for effecting indexing of the carrier means first occasions an arresting of a moulding box at each station during is progress and subsequently occasions the bringing into operation of the master valve mechanism and consequently the performance simultaneously at the relevant stations at which a moulding box may be halted of the operations of sand filling, sand squeezing and moulding box unloading.

References Cited in the file of this patent

UNITED STATES PATENTS

| | | |
|---|---|---|
| 305,425 | Catlin | Sept. 23, 1884 |
| 567,884 | Brown | Sept. 15, 1896 |
| 1,707,411 | Nicholls | Apr. 2, 1929 |
| 1,803,117 | Lesser et al. | Apr. 28, 1931 |
| 2,049,967 | Luton | Aug. 4, 1936 |
| 2,376,203 | Stemmler et al. | May 15, 1945 |
| 2,668,450 | Crookston et al. | Feb. 9, 1954 |